US008275560B2

(12) United States Patent
Radhakrishnan et al.

(10) Patent No.: US 8,275,560 B2
(45) Date of Patent: Sep. 25, 2012

(54) POWER MEASUREMENT TECHNIQUES OF A SYSTEM-ON-CHIP (SOC)

(75) Inventors: Sivakumar Radhakrishnan, Portland, OR (US); Sin S. Tan, Portland, OR (US); Stephan J. Jourdan, Portland, OR (US); Lily P. Looi, Portland, OR (US); Yi-Feng Liu, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 447 days.

(21) Appl. No.: 12/557,263

(22) Filed: Sep. 10, 2009

(65) Prior Publication Data

US 2011/0060931 A1    Mar. 10, 2011

(51) Int. Cl.
*G01R 15/00* (2006.01)
*G01R 19/00* (2006.01)
*G01R 21/00* (2006.01)
*G06F 1/00* (2006.01)

(52) U.S. Cl. ............... 702/60; 702/57; 702/61; 702/62; 702/64; 713/300

(58) Field of Classification Search ............... 713/300; 702/57, 60, 61, 62, 64
See application file for complete search history.

(56) References Cited

U.S. PATENT DOCUMENTS

| | | | | |
|---|---|---|---|---|
| 5,673,420 | A * | 9/1997 | Reyes et al. ................... | 716/106 |
| 5,848,281 | A | 12/1998 | Smalley et al. | |
| 7,031,854 | B2 | 4/2006 | Lin et al. | |
| 7,562,233 | B1 * | 7/2009 | Sheng et al. ................... | 713/300 |
| 7,715,995 | B2 * | 5/2010 | Goodnow et al. ............... | 702/60 |
| 2005/0289367 | A1 * | 12/2005 | Clark et al. .................... | 713/300 |
| 2007/0188184 | A1 * | 8/2007 | Athas et al. .................... | 324/763 |
| 2008/0209285 | A1 * | 8/2008 | Acharyya et al. ............. | 714/724 |
| 2008/0229130 | A1 | 9/2008 | Guan et al. | |
| 2009/0157334 | A1 * | 6/2009 | Goodnow et al. ............... | 702/61 |
| 2009/0204834 | A1 | 8/2009 | Hendin et al. | |
| 2009/0248928 | A1 * | 10/2009 | Mandhani et al. ............ | 710/105 |

OTHER PUBLICATIONS

Advanced Configuration and Power Interface Specification, Oct. 10, 2006, 631 pages, Revision 3.0b, Hewlett-Packard Corporation, Intel Corporation, Microsoft Corporation, Phoenix Technologies Ltd., Toshiba Corporation.
International Search Report and Written Opinion for International Patent Application No. PCT/US2010/046103, Mailed Apr. 28, 2011, 8 pages.

* cited by examiner

*Primary Examiner* — Mark Connolly
(74) *Attorney, Agent, or Firm* — Blakely, Sokoloff, Taylor & Zafman LLP

(57) ABSTRACT

A method and system to enable power measurements of a system-on-chip in various modes. In one embodiment of the invention, the system-on-chip has full controllability of its logic and circuitry to facilitate configuration of the system-on-chip into a desired mode of operation. This allows hooks or interfaces to access the system-on-chip externally for measurements. For example, in one embodiment of the invention, the hooks in the system-on-chip allow a backend tester to configure the system-on-chip into various modes easily to perform power consumption measurements of one or more individual components of the system-on-chip. The power consumption measurement of the individual components in the system-on-chip can be performed faster and can be more accurate. In addition, the overall yield of the SOC can be increased as it is easier to detect failure parts.

24 Claims, 5 Drawing Sheets

POWER MEASUREMENT TECHNIQUES OF A SYSTEM-ON-CHIP (SOC)

FIELD OF THE INVENTION

This invention relates to a system-on-chip, and more specifically but not exclusively, to the techniques to enable power measurements of the system-on-chip in various modes.

BACKGROUND DESCRIPTION

In a system-on-chip (SOC), the components of the SOC are integrated on a single chip. While the high integration of the components in the SOC provides advantages such as chip area savings and better signal quality, the power consumption measurements of each individual component can be difficult because the logic and power domains in the SOC cannot be isolated easily using external means.

When the SOC is used in a mobile platform, the idle power consumption of the SOC is a key metric to determine the battery life of the mobile platform. Similarly, the thermal design power of the SOC is another key metric for the mobile platform as it indicates the maximum power consumed under real application workload. The dynamic power consumption of the SOC can assist in the design of a chassis for the mobile platform to make it more efficient, in the design of a heat sink with better heat dissipation and/or the platform cooling design. In a conventional SOC design, measuring the idle and dynamic power consumption of the SOC is not easy and may not be possible depending on the design of the SOC.

BRIEF DESCRIPTION OF THE DRAWINGS

The features and advantages of embodiments of the invention will become apparent from the following detailed description of the subject matter in which.

DETAILED DESCRIPTION

Figure 1:
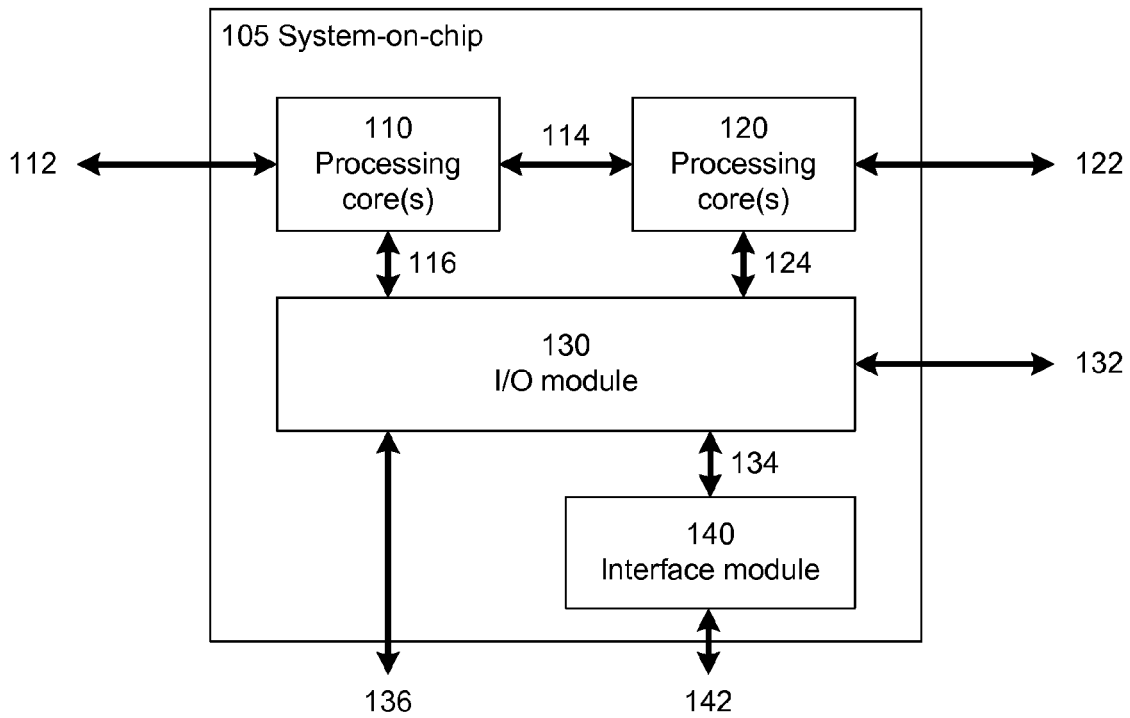
FIG. 1 illustrates a block diagram of a SOC in accordance with one embodiment of the invention.

Embodiments of the invention described herein are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference numerals have been repeated among the figures to indicate corresponding or analogous elements. Reference in the specification to "one embodiment" or "an embodiment" of the invention means that a particular feature, structure, or characteristic described in connection with the embodiment is included in at least one embodiment of the invention. Thus, the appearances of the phrase "in one embodiment" in various places throughout the specification are not necessarily all referring to the same embodiment.

Embodiments of the invention provide a method and system to enable power measurements of a SOC in various modes. In one embodiment of the invention, the SOC has full controllability of its logic and circuitry to facilitate configuration of the SOC into a desired mode of operation. This allows hooks and/or mechanisms to access the SOC externally to configure the SOC. For example, in one embodiment of the invention, the hooks in the SOC allow a backend tester to configure the SOC into various modes easily to perform power consumption measurements of one or more individual components of the SOC. The power consumption measurement of the individual components in the SOC can be performed faster and can be more accurate. In addition, the overall yield of the SOC can be increased as it is easier to detect failure parts based on the individual power consumptions of the components of the SOC.

The following figures described herein illustrate the various techniques to facilitate full controllability of the logic and I/O circuitry in the SOC to perform power measurements of the components of the SOC. FIG. 1 illustrates a block diagram 100 of a SOC 105 in accordance with one embodiment of the invention. The SOC 105 has two processing cores 110 and 120 that are coupled with an input/output (I/O) module 130 via communication links 116 and 124 respectively. The processor cores 110 and 120 communicate with each other via communication link 114 and can be accessed externally via communication links 112 and 122 respectively. The processor cores 110 and 120 may be combined into a single module in another embodiment of the invention. Each processor core 110 and 120 may also have more than one processing unit in another embodiment of the invention.

The I/O module 130 provides an external interface to the processing cores 110 and 120 via communication links 132 and 136. In one embodiment of the invention, the I/O module 130 has control logic to facilitate enabling or disabling the core logic and the I/O circuits in the I/O module 130 and/or the SOC 105. For example, in one embodiment of the invention, when idle power consumption of the I/O module 130 is to be measured, the control logic in the I/O module 130 switches off the core logic and I/O circuits to minimize the switching activity and power consumption of the I/O module 130.

In one embodiment of the invention, the I/O module 130 has a number of power domains that connects the various internal logic blocks in the I/O module. By separating the various internal logic blocks into different power domains or planes, the power consumption of the various internal logic blocks can easily be controlled and measured.

The SOC 105 may also have an interface module 140 coupled with the I/O module 130 via the communication link 134 and can be access externally via the communication link 142. The communication links include, but is not limited to, a Direct Media Interface (DMI), a Peripheral Component Interconnect Express (PCI-E) interface, a Common System Interface (CSI), and any other suitable communication protocol.

The components illustrated in the SOC 105 are not meant to be limiting and in other embodiments of the invention, the configuration of the SOC 105 includes other components that are not shown in FIG. 1. One of ordinary skill in the relevant art will appreciate that other configuration of the SOC 105 can be used without affecting the workings of the invention. In addition, the techniques described for the I/O module 130 are also not meant to be limiting. One of ordinary skill in the relevant art will readily appreciate that the techniques may be applied to other components in the SOC 105 without affecting the workings of the invention.

Figure 2:
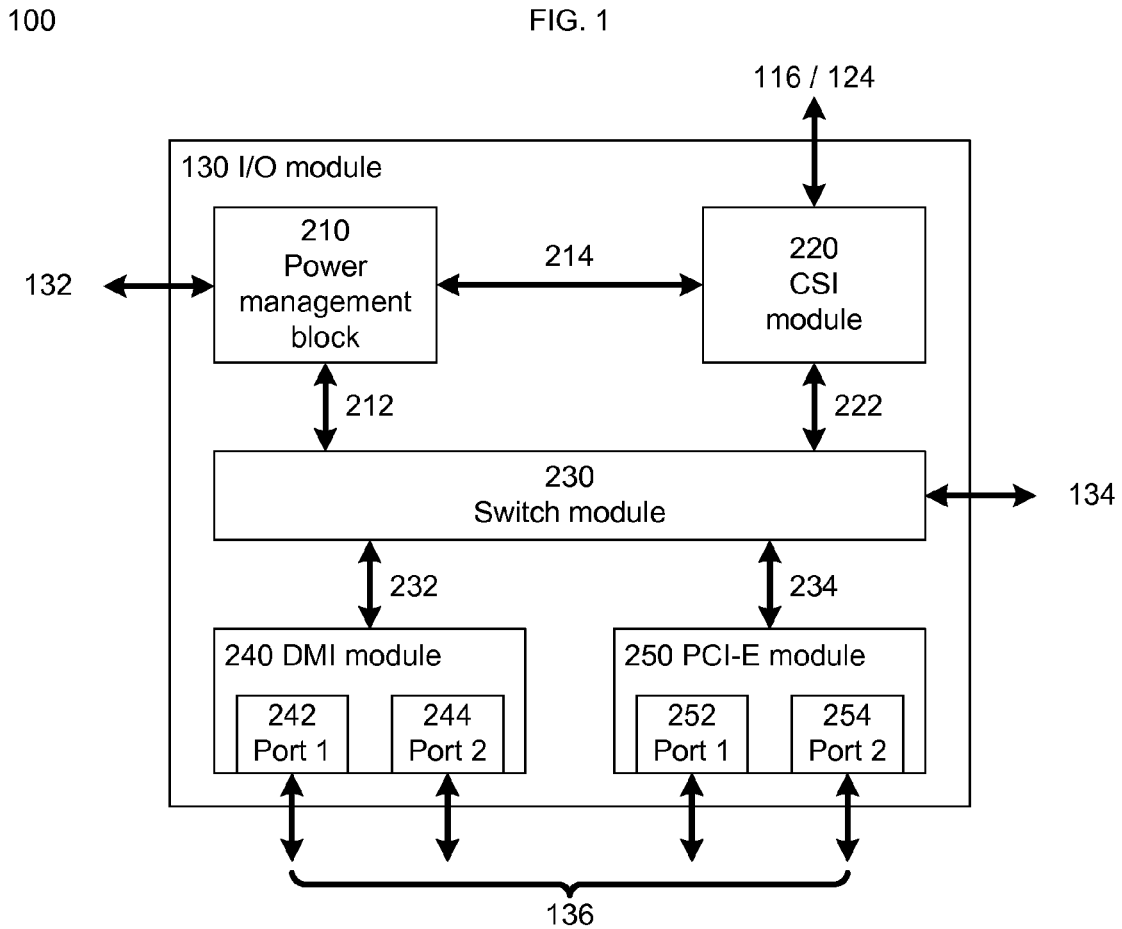
FIG. 2 illustrates a block diagram of an input/output module in accordance with one embodiment of the invention.

FIG. 2 illustrates a block diagram 200 of an I/O module 130 in accordance with one embodiment of the invention. The I/O module 130 has a power management block 210, a Common System Interface (CSI) module 220, a switch module 230, a DMI module 240, and a PCI-E module 250. The power management block 210 has logic to allow full controllability of the I/O module 130 in one embodiment of the invention. For example, in one embodiment of the invention, the power management block 210 has control logic to configure the interface state for each interface/communication link 116, 124, 132, 134 and 136. Based on the desired mode of operation, the power management block 210 can set the desired interface state of each interface of the I/O module 130. In one embodiment of the invention, the control logic of the power management block 210 is implemented using, but not limited to, registers, state machines, combinational logic and the like.

The CSI module 220 interfaces between the I/O module 130 and the processing cores 110 and 120 via the communication links 116 and 124 respectively. In one embodiment of the invention, the CSI module 220 has logic to simulate the communication to and from the processing cores 110 and 120. By doing so, this allows the processing cores 110 and 120 to be set into an idle or quiescence mode while the I/O module 130 can be operated or exercised in a dynamic or functional mode for dynamic power consumption measurements. For example, in one embodiment of the invention, when the dynamic power consumption of only the I/O module 130 is to be measured, the processing cores 110 and 120 are set into an idle mode and any communication to and from the processing cores 110 and 120 are not actually relayed to the processing cores 110 and 120 but simulated by the CSI module 220. This allows the dynamic power consumption measurements of the I/O module 130 to be close to the real traffic or application workload.

In one embodiment of the invention, the CSI module 220 simulates a read command to the processing cores 110 and 120 by returning inbound dummy read completions with a known signature/value at a user settable frequency of the processing cores 110 and 120. Similarly, the CSI module 220 simulates a write command to the processing cores 110 and 120 by dropping the writes at the CSI interface of the CSI module 220. This ensures that the logic in the CSI module 220 can be exercised during the measurement of the dynamic power consumption of the I/O module 130 even if the processing cores 110 and 120 are kept in idle mode.

The switch module 230 manages the routing of communication traffic among the power management block 210, the CSI module 220, the DMI module 240, and the PCI-E module 250. For example, in one embodiment of the invention, the switch module 230 receives data from the port 1 242 of the DMI module 240 and sends the received data to the CSI module 220. The switch module performs conversion of the data formats when necessary during the routing of the communication traffic in one embodiment of the invention.

In one embodiment of the invention, the switch module 230 has logic to determine whether the incoming communication traffic involves the processing cores 110 and 120. For example, in one embodiment of the invention, if the incoming communication traffic involves or requires routing of the traffic from one port to another port, the switch module 230 performs the routing of the traffic without activating the processing cores 110 and 120. If the processing cores 110 and 120 are in an idle state when the incoming communication traffic is received, the processing cores 110 and 120 can remain in the idle state while the switch module 230 performs the routing of the traffic or data. With the logic in the switch module 230, the processing cores 110 and 120 are not unnecessarily activated or woken up from its idle state and can remain in its idle state for longer periods of time to save power consumption.

In one embodiment of the invention, the switch module 230 can determine whether the incoming communication traffic involves the processing cores 110 and 120 by examining the source and destination headers of the communication traffic. For example, in one embodiment of the invention, when the I/O module 130 receives data from the port 1 252 of the PCI-E module 250, the data is sent to the switch module 230 via communication link 234.

After receiving the data, the switch module 230 checks the header(s) of the received data and determines the destination of the received data. If the destination of the received data is to another port or interface other than the CSI interface in the CSI module 220, i.e., peer-to-peer traffic, the switch module 230 routes the received data to the respective port or interface without the need for the processing cores 110 and 120 to process the received data. The peer-to-peer traffic includes, but is not limited to, graphics data, keyboard emulations, inter-port data and the like.

For example, in one embodiment of the invention, the switch module 230 routes the data from port 1 252 of the PCI-E module 250 to the port 2 244 of the DMI module 240 without activating the processing cores 110 and 120. This allows the SOC 105 to conserve power as the processing cores 110 and 120 can remain in an idle state when peer-to-peer traffic is received. One of ordinary skill in the relevant art will readily appreciate that other methods of determining whether peer-to-peer traffic is received can also be applicable to the invention without affecting the workings of the invention.

The DMI module 240 and the PCI-E module 250 illustrate two interfaces of the I/O module 130 and are not meant to be limiting. In other embodiments of the invention, the DMI module 240 and the PCI-E module 250 can have more than two or less than two ports and each port can have different speeds and configuration. One of ordinary skill in the relevant will readily appreciate that other configurations of the DMI module 240 and the PCI-E module 250 can be used without affecting the workings of the invention.

Figure 3:
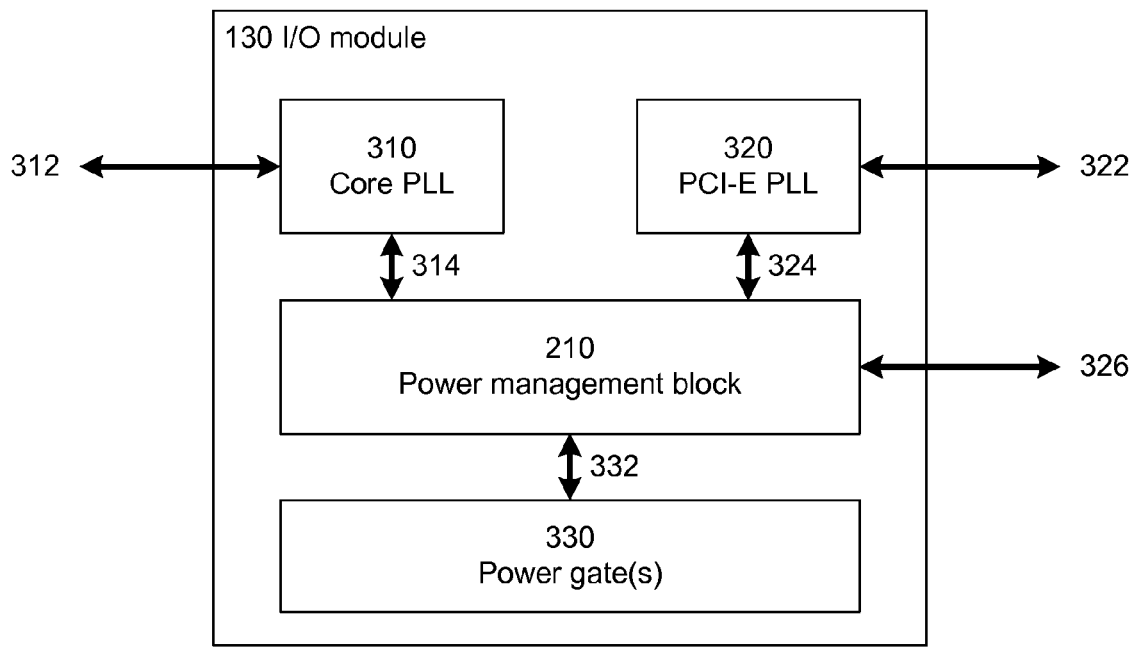
FIG. 3 illustrates a block diagram of the modules controlled by a power management block in accordance with one embodiment of the invention.

FIG. 3 illustrates a block diagram 300 of the modules controlled by the power management block 210 in accordance with one embodiment of the invention. For the purposes of illustration, the I/O module is assumed to have two clock sources, the core phase lock loop (PLL) and the PCI-E PLL 320. The PCI-E PLL 320 provides the clock(s) to the PCI-E module 250 and the core PLL 310 provides the clock (s) to the I/O module 130 and other modules in the SOC 105 as required.

The power management block 210 is coupled with the core PLL 310 and the PCI-E PLL 320 to control the clock gating of the clocks provided by the core PLL 310 and the PCI-E PLL 320. By clock gating the clocks to the unused cluster of logic that can be switched off in an idle mode of the I/O module 130 and/or the SOC 105, the power management block 210 allows the SOC 105 to save power. In one embodiment of the invention, the power management block 210 sends the clock gating signals to the core PLL 310 and the PCI-E PLL 320 via the communication links 314 and 324 respectively. In another embodiment of the invention, the power management block 210 sends the clock gating signals to the core PLL 310 and the PCI-E PLL 320 via a separate communication link (Not shown in FIG. 3).

The power management block 210 is also coupled to one or more power gates 330. To facilitate the power consumption measurement of the I/O module 103, the various internal logic blocks in the I/O module 130 are separated into one or more power domains or voltage planes. In one embodiment of the invention, unused logic that can be switched off when the I/O module 130 is in an idle state is connected to one or more particular power domains. Each particular power domain of the unused logic is connected with a power gate in one embodiment of the invention.

The power gate is a large transistor implemented in the I/O module 130 and is positioned between the voltage input pad (s) or bump(s) on the die or package of the SOC 105 and any unused logic in one embodiment of the invention. The power gate(s) passes the voltage supplied from the voltage input pad(s) or bump(s) with a very small voltage drop to the logic that is power gated. When the power gate is activated or enabled, it reduces the voltage to the gated logic from a normal voltage level to a minimum retention voltage level. The minimum retention voltage level is the lowest voltage level where the logic coupled to the power gate is still able to retain its functional or previous value. In one embodiment of the invention, the retention voltage level is determined based on factors including, but not limited to, the process constraints, statistical analysis of state changes in the gated logic, the failure rate of the register bits in the gated logic, and the like.

By activating the power gate(s) to the gated logic, it allows the I/O module 103 to save power consumption when it is in an idle mode because the voltage to the gated logic is reduced from a normal level to a minimum retention level. In one embodiment of the invention, the power management block 210 has programmable registers that control the clock gating in the core PLL 310 and the PCI-E PLL 320 and the power gate(s). This facilitates the control of the SOC 105 to a desired mode of operation for power consumption measurements. In one embodiment of the invention, the programmable registers of the power management block 210 are accessible directly via the communication link 132. This allows a hook or a mechanism to control the configuration of the SOC 105 easily for power consumption measurements. In addition, the hooks allow burn-in testing, quality and reliability testing, characterization measurements to be performed with ease and with better accuracy. In another embodiment of the invention, the power management block 210 has status registers that reflect the condition or status of the I/O module 130 and/or the SOC 105.

In another embodiment of the invention, the power management block 210 switches off unnecessary parts of the I/O circuits in the SOC 105 when the SOC 105 is in an idle mode. For example, in one embodiment of the invention, the power management block 210 keeps only one squelch circuit active in the PCI-E module 250 and the DMI module 240 when the SOC 105 is in an idle mode. The squelch circuit detects impending traffic burst when the interface is in an idle or sleep state. The squelch I/O logic circuitry attempts to detect differential voltage in the differential pins of the interface to sense activity and prepares the interface to exit from idle or sleep state.

The techniques described for the I/O module 130 are meant for illustration and it is not limited only to the I/O module 130. One of ordinary skill in the relevant art will readily appreciate how to apply similar techniques to the other components of the SOC 105 and it will not be described herein.

Figure 4:
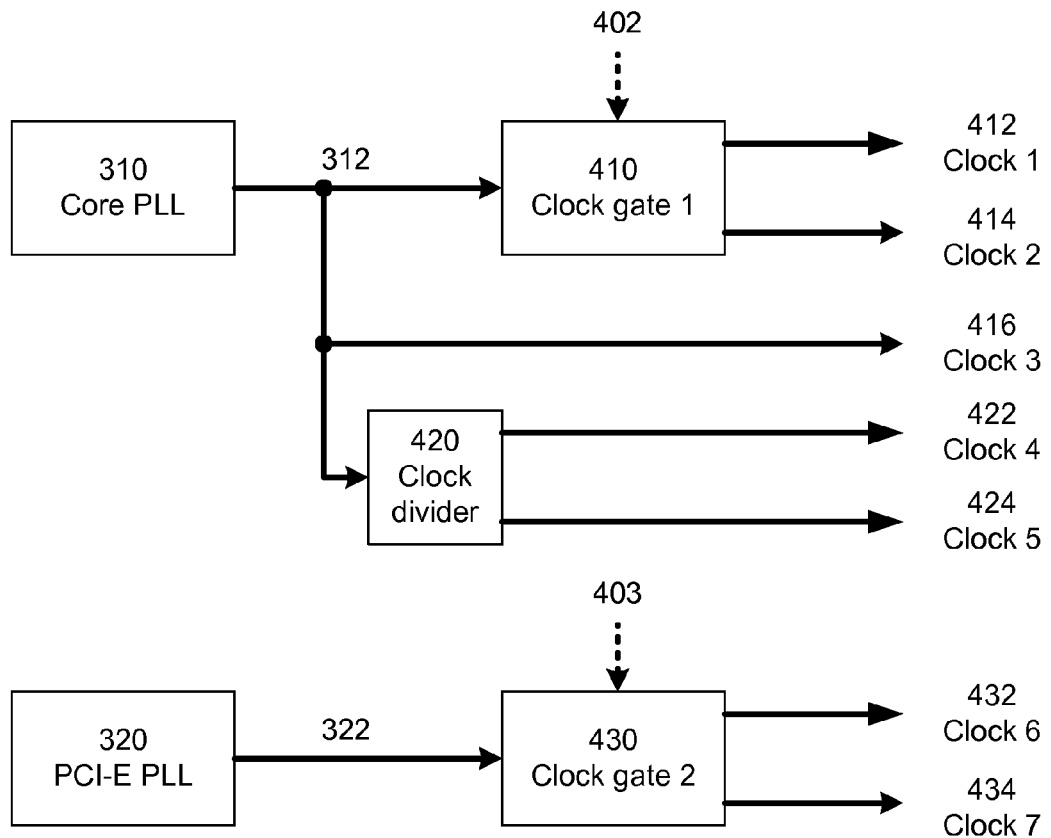
FIG. 4 illustrates a clock gating scheme in an input/output module in accordance with one embodiment of the invention.

FIG. 4 illustrates a clock gating scheme 400 in the I/O module 130 in accordance with one embodiment of the invention. The core PLL 310 provides a main clock 312 to the clock gate 1 410 and the clock divider 420. The clock gate 1 410 controls clock 1 412 and clock 2 414 that can be disabled when the I/O module 130 is set in an idle mode or state. In one embodiment of the invention, the clock gate 1 410 is controlled by the control signal(s) 402 from the power management block 210. In another embodiment of the invention, the power management block 210 sends the control signal(s) to the clock gate 1 410 via the core PLL 310. One of ordinary skill in the relevant art will readily appreciate that other methods of controlling the clock gate 1 410 can be used without affecting the workings of the invention.

Clock 1 412 and clock 2 414 are provided to the logic in the I/O module 130 and/or the other components of the SOC 105 that can be switched off or disabled during an idle mode of the SOC 105 in one embodiment of the invention. Clock 3 416 illustrates a clock that is provided to the logic that cannot be switched off even when the I/O module 130 or SOC 105 is in an idle mode. For example, in one embodiment of the invention, clock 3 416 is provided to the power management block 210 and clock 3 416 is not clock gated because the power management block 210 needs to be active in an idle mode of the I/O module 130 to ensure that the I/O module 130 can be switched back to normal operating mode from an idle mode.

The clock divider 420 illustrates that the main clock 312 can be divided or scaled down to other clock frequencies to form clock 4 422 and clock 5 425. The PCI-E PLL 320 also provides a main clock 322 to a clock gate 2 430. Clocks 432 and 434 can also be disabled when the I/O module 130 is set in an idle mode. Similarly, in one embodiment of the invention, the clock gate 2 430 is controlled by the control signal(s) 403 from the power management block 210. The control signals 402 and 403 of the clock gates 410 and 430 can be enabled or disabled in parallel in one embodiment of the invention. In another embodiment of the invention, the control signals 402 and 403 of the clock gates 410 and 430 can be enabled or disabled independent of each other.

In one embodiment of the invention, the core PLL 310 and the PCI-E PLL 320 can be bypassed when the I/O module 130 and/or the SOC 105 is in an idle mode. This allows the core PLL 310 and the PCI-E PLL 320 to be disabled by the power management block 210 to save power consumption of the SOC 105. In this scenario, the clock source of the power management block 210 can be provided by an external source. The clock gating scheme 400 as illustrated is not meant to be limiting. One of ordinary skill in the relevant art will readily appreciate that other configurations of the clock gating scheme can be utilized without affecting the workings of the invention.

Figure 5:
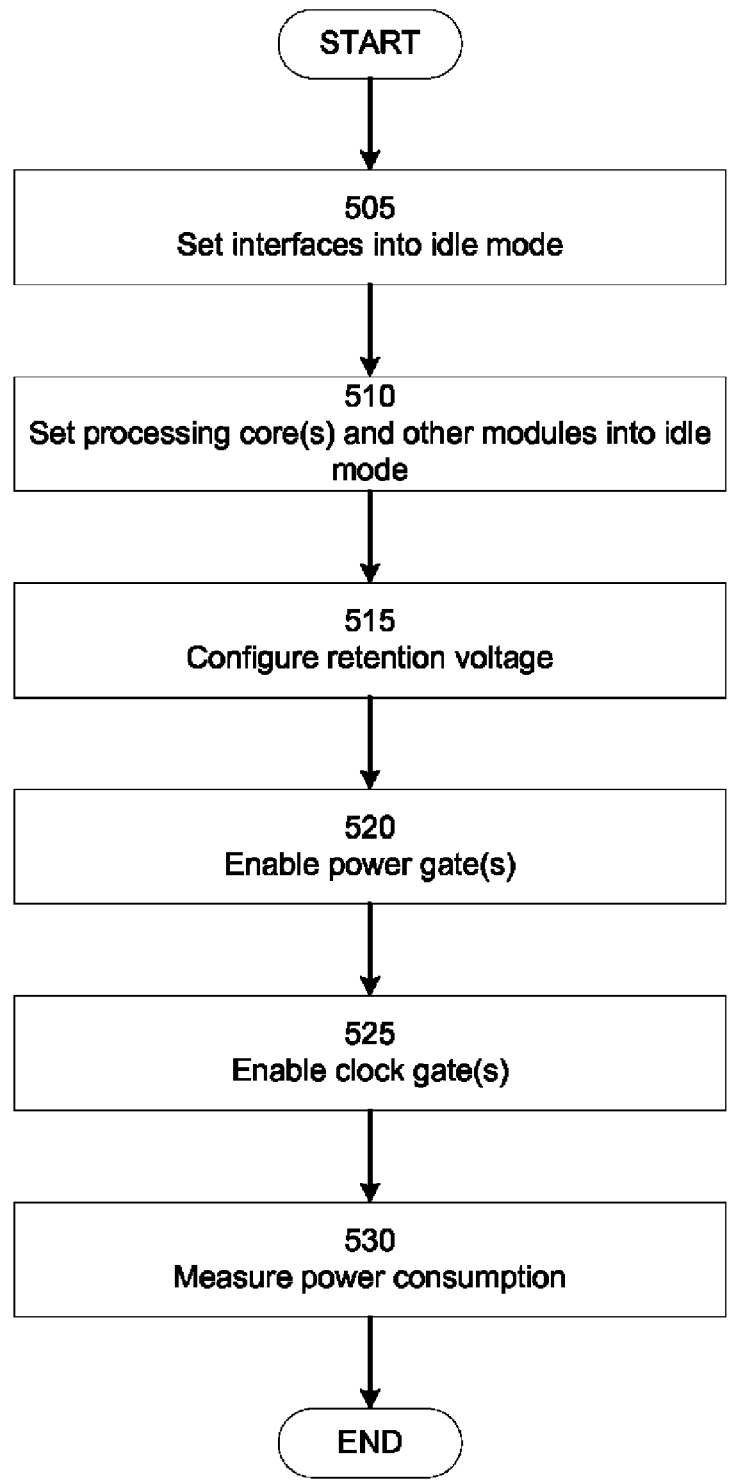
FIG. 5 illustrates a flow chart of the steps to perform idle power consumption measurements of an input/output module in accordance with one embodiment of the invention.

FIG. 5 illustrates a flow chart 500 of the steps to perform idle power consumption measurements of the I/O module 130 in accordance with one embodiment of the invention. For clarity of illustration, FIG. 5 is discussed with reference to FIG. 2. In step 505, the power management block 210 switches all the interfaces into an idle mode. For example, in one embodiment of the invention, the power management block 210 switches the CSI interface in the CSI module 220, the ports 242 and 244 in the DMI module 240, the ports 252 and 254 in the PCI-E module 250 to an idle state.

In one embodiment of the invention, the interfaces of the I/O module 130 and/or the SOC 105 are compliant with an Active State Power Management (ASPM) protocol. For example, in one embodiment of the invention, if the I/O module 130 is compliant with ASPM, the power management block 210 switches the CSI interface in CSI module 220, the ports 242 and 244 in the DMI module 240, the ports 252 and 254 in the PCI-E module 250 to a L1 state when the appropriate control register(s) in the power management block 210 is set in step 505.

In step 510, the processing cores 110 and 120 and the interface 140 are set into an idle mode or low power state. In one embodiment of the invention, the processing cores 110 and 120 are compliant with the advanced configuration and power interface (ACPI) standard (ACPI standard, "Advanced Configuration and Power Interface Specification", Revision 3.0b, published 10 Oct. 2006). For example, in one embodiment of the invention, if the processing cores 110 and 120 are compliant with ACPI, the processing cores 110 and 120 are set to power state C6 or C7 in step 510.

In step 515, the retention voltage of the power gate(s) is set or configured in one embodiment of the invention. The retention voltage is set by using appropriate fuse settings in the I/O module 130 in one embodiment of the invention. In another embodiment of the invention, the retention voltage may be set to a default voltage level and no configuration is required. In step 520, the power management block 210 enables the power gate(s). In step 525, the power management block 210 enables the clock gate(s).

The power consumption of the I/O module 130 is measured in step 530 and the flow ends. The measurement of the power consumption of the I/O module 130 is determined by measuring the current via the voltage supply of the I/O module 130 through a resistor of known resistance in one embodiment of the invention. Although the flow 500 describes the power measurement of only the I/O module 130, it is not meant to be limiting. One of ordinary skill in the relevant will readily appreciate how to apply similar techniques to other components in the SOC 105 to determine the power consumption of the other components in the SOC 105.

Figure 6:
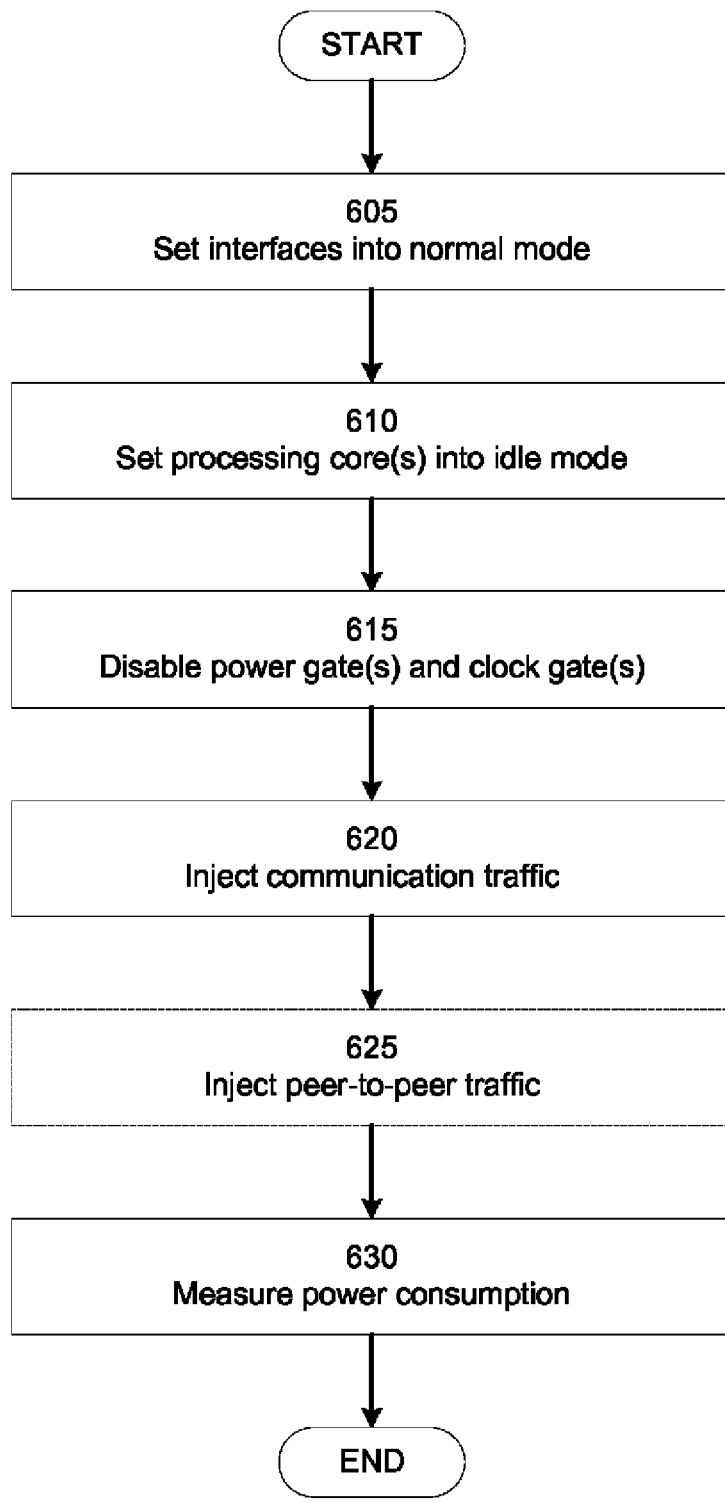
FIG. 6 illustrates a flow chart of the steps to perform dynamic power consumption measurements of an input/output module in accordance with one embodiment of the invention.

FIG. 6 illustrates a flow chart 600 of the steps to perform dynamic power consumption measurements of the I/O module 130 in accordance with one embodiment of the invention. For clarity of illustration, FIG. 6 is discussed with reference to FIG. 2. In step 605, the power management block 210 switches or sets all the interfaces into a normal mode or state. For example, in one embodiment of the invention, the power management block 210 switches the CSI interface in CSI module 220, the ports 242 and 244 in the DMI module 240, the ports 252 and 254 in the PCI-E module 250 to a normal state.

In one embodiment of the invention, if the I/O module 130 is compliant with ASPM, the power management block 210 switches the CSI interface in CSI module 220, the ports 242 and 244 in the DMI module 240, the ports 252 and 254 in the PCI-E module 250 to a L0 state when the appropriate control register(s) in the power management block 210 is set in step 605.

In step 610, the processing cores 110 and 120 and the interface 140 are set into an idle mode or low power state. For example, in one embodiment of the invention, if the processing cores 110 and 120 are compliant with ACPI, the processing cores 110 and 120 are set in power state C6 or C7 state in step 610. In step 615, the power management block 210 disables or deactivates the power gate(s) and disables the clock gate(s). This allows the I/O module 130 to operate in normal mode where all clocks are enabled and the voltage level is set at normal levels.

In step 620, communication traffic is injected or provided to the I/O module 130 to activate or exercise as much of the logic in the I/O module 130. For example, in one embodiment of the invention, read and write communication traffic is sent to the I/O module 130 via the ports 242 and 244 in the DMI module 240, and the ports 252 and 254 in the PCI-E module 250. The CSI module is able to simulate read and write commands from the processing cores 110 and 120 when any traffic from the ports 242 and 244 in the DMI module 240, and the ports 252 and 254 in the PCI-E module 250 are directed to the processing cores 110 and 120. One of ordinary skill in the relevant art will readily appreciate that other methods of exercising the logic in the I/O module 130 can also be used and these other methods are applicable to the invention without affecting the workings of the invention.

In optional step 625, peer-to-peer traffic is also injected into the I/O module 130 if the switch module 230 is able to facilitate or support peer-to-peer traffic. For example, in one embodiment of the invention, when data designated for port 2254 in the PCI-E module 250 is received via port 1242 in the DMI module 240, the switch module 230 is able to route the data without involving the processing cores 110 and 120. The dynamic power consumption of the I/O module 130 is measured in step 630 and the flow ends. The measurement of the power consumption of the I/O module 130 is determined by measuring the current via the voltage supply of the I/O module 130 through a resistor of known resistance in one embodiment of the invention. Although the flow 600 describes the power measurement of only the I/O module 130, it is not meant to be limiting. One of ordinary skill in the relevant will readily appreciate how to apply similar techniques to other components in the SOC 105 to determine the power consumption of the other components in the SOC 105.

Figure 7:
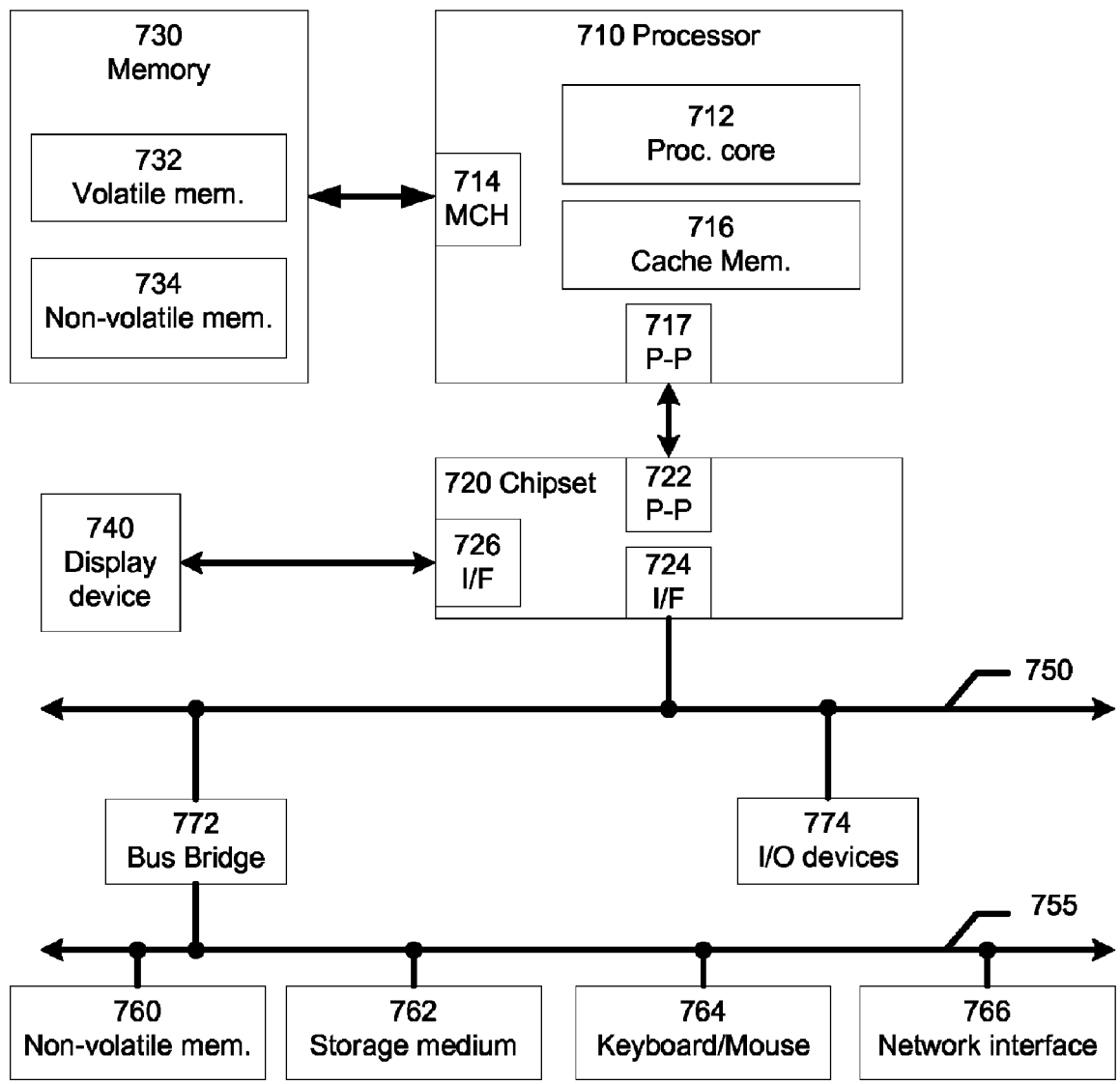
FIG. 7 illustrates a system to implement the methods disclosed herein in accordance with one embodiment of the invention.

FIG. 7 illustrates a system 700 to implement the methods disclosed herein in accordance with one embodiment of the invention. The system 700 includes, but is not limited to, a desktop computer, a laptop computer, a netbook, a notebook computer, a personal digital assistant (PDA), a server, a workstation, a cellular telephone, a mobile computing device, an Internet appliance or any other type of computing device. In another embodiment, the system 700 used to implement the methods disclosed herein may be a system on a chip (SOC) system.

The processor 710 has a processing core 712 to execute instructions of the system 700. The processing core 712 includes, but is not limited to, pre-fetch logic to fetch instructions, decode logic to decode the instructions, execution logic to execute instructions and the like. The processor 710 has a cache memory 716 to cache instructions and/or data of the system 700. In another embodiment of the invention, the cache memory 716 includes, but is not limited to, level one, level two and level three, cache memory or any other configuration of the cache memory within the processor 710.

The memory control hub (MCH) 714 performs functions that enable the processor 710 to access and communicate with a memory 730 that includes a volatile memory 732 and/or a non-volatile memory 734. The volatile memory 732 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. The non-volatile memory 734 includes, but is not limited to, NAND flash memory, phase change memory (PCM), read only memory (ROM), electrically erasable programmable read only memory (EEPROM), or any other type of non-volatile memory device.

The memory 730 stores information and instructions to be executed by the processor 710. The memory 730 may also stores temporary variables or other intermediate information while the processor 710 is executing instructions. The chipset 720 connects with the processor 710 via Point-to-Point (PtP) interfaces 717 and 722. The chipset 720 enables the processor 710 to connect to other modules in the system 700. In one embodiment of the invention, the interfaces 717 and 722 operate in accordance with a PtP communication protocol such as the Intel® QuickPath Interconnect (QPI) or the like.

The chipset 720 connects to a display device 740 that includes, but is not limited to, liquid crystal display (LCD), cathode ray tube (CRT) display, or any other form of visual display device. In one embodiment of the invention, the processor 710 and the chipset 720 are merged into a SOC. In addition, the chipset 720 connects to one or more buses 750 and 755 that interconnect the various modules 774, 760, 762, 764, and 766. Buses 750 and 755 may be interconnected together via a bus bridge 772 if there is a mismatch in bus speed or communication protocol. The chipset 720 couples with, but is not limited to, a non-volatile memory 760, a mass storage device(s) 762, a keyboard/mouse 764 and a network interface 766.

The mass storage device 762 includes, but is not limited to, a solid state drive, a hard disk drive, an universal serial bus flash memory drive, or any other form of computer data storage medium. The network interface 766 is implemented using any type of well known network interface standard including, but not limited to, an Ethernet interface, a universal serial bus (USB) interface, a Peripheral Component Interconnect (PCI) Express interface, a wireless interface and/or any other suitable type of interface. The wireless interface operates in accordance with, but is not limited to, the IEEE 802.11 standard and its related family, Home Plug AV (HPAV), Ultra Wide Band (UWB), Bluetooth, WiMax, or any form of wireless communication protocol.

While the modules shown in FIG. 7 are depicted as separate blocks within the system 700, the functions performed by some of these blocks may be integrated within a single semiconductor circuit or may be implemented using two or more separate integrated circuits. For example, although the cache memory 716 is depicted as a separate block within the processor 710, the cache memory 716 can be incorporated into the processor core 712 respectively. The system 700 may include more than one processor/processing core in another embodiment of the invention.

The methods disclosed herein can be implemented in hardware, software, firmware, or any other combination thereof. Although examples of the embodiments of the disclosed subject matter are described, one of ordinary skill in the relevant art will readily appreciate that many other methods of implementing the disclosed subject matter may alternatively be used. In the preceding description, various aspects of the disclosed subject matter have been described. For purposes of explanation, specific numbers, systems and configurations were set forth in order to provide a thorough understanding of the subject matter. However, it is apparent to one skilled in the relevant art having the benefit of this disclosure that the subject matter may be practiced without the specific details. In other instances, well-known features, components, or modules were omitted, simplified, combined, or split in order not to obscure the disclosed subject matter.

The term "is operable" used herein means that the device, system, protocol etc, is able to operate or is adapted to operate for its desired functionality when the device or system is in off-powered state. Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

The techniques shown in the figures can be implemented using code and data stored and executed on one or more computing devices such as general purpose computers or computing devices. Such computing devices store and communicate (internally and with other computing devices over a network) code and data using machine-readable media, such as machine readable storage media (e.g., magnetic disks; optical disks; random access memory; read only memory; flash memory devices; phase-change memory) and machine readable communication media (e.g., electrical, optical, acoustical or other form of propagated signals—such as carrier waves, infrared signals, digital signals, etc.).

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A method comprising:
   setting one or more interfaces of a system-on-chip (SOC) into an idle mode, wherein setting the one or more interfaces of the SOC into the idle mode comprises setting one or more mode registers associated with the one of more interfaces of the SOC;
   setting one or more processor cores in the SOC into an idle state;
   disabling one or more clock inputs to the SOC;
   reducing a voltage level of one or more logic blocks of the SOC, the one or more logic blocks having a common voltage plane; and
   measuring a power consumption of the SOC.

2. The method of claim 1, wherein the one or more logic blocks of the SOC comprise one or more registers, and wherein reducing the voltage level of the one or more logic blocks of the SOC comprises reducing the voltage level of the one or more logic blocks such that each register is able to retain its state.

3. The method of claim 1, wherein the one or more interfaces of the SOC comprise one or more of a Direct Media Interface (DMI), a Peripheral Component Interconnect Express (PCI-E) interface, and a Common System Interface (CSI).

4. The method of claim 1, wherein the idle mode of the one or more interfaces of the SOC is compliant at least in part with an Active State Power Management (ASPM) idle state.

5. The method of claim 1, wherein disabling the one or more clock inputs to the SOC comprises turning off one or more Phase Locked Loops (PLLs) of the SOC.

6. The method of claim 1, wherein the idle state of the one or more processor cores is compliant at least in part with an Advanced Configuration and Power Interface (ACPI) idle state.

7. A method comprising:
   setting one or more interfaces of a system-on-chip (SOC) into an active mode;
   setting one or more processor cores in the SOC into an idle state;
   enabling one or more clock inputs to the SOC;
   providing communication traffic to the SOC; and
   measuring a power consumption of the SOC.

8. The method of claim 7, wherein setting the one or more interfaces of the SOC into the active mode comprises setting one or more mode registers associated with the one of more interfaces of the SOC.

9. The method of claim 7, further comprising providing peer-to-peer communication traffic to the SOC.

10. The method of claim 7, wherein the one or more interfaces of the SOC comprise one or more of a Direct Media Interface (DMI), a Peripheral Component Interconnect Express (PCI-E) interface, and a Common System Interface (CSI).

11. The method of claim 7, wherein the idle mode of the one or more interfaces of the SOC is compliant at least in part with an Active State Power Management (ASPM) idle state.

12. The method of claim 7, wherein the idle state of the one or more processor cores is compliant at least in part with an Advanced Configuration and Power Interface (ACPI) idle state.

13. An apparatus comprising:
power management logic to:
control one or more power gates, each power gate coupled with a voltage input and a power domain of one or more logic blocks, wherein each power gate, in response to a deactivation of each power gate, is to:
reduce the voltage input; and
provide the reduced voltage input to the power domain of the one or more logic blocks; and
control one or more clock inputs to the one or more logic blocks.

14. The apparatus of claim 13, wherein the power management logic is further to control input/output (I/O) logic of the apparatus.

15. The apparatus of claim 13, wherein the one or more clock inputs comprise one or more Phase Lock Loops (PLLs) clock inputs.

16. The apparatus of claim 13, wherein the apparatus further comprises a processor having one or more processing cores, and wherein the power management unit is further to control an operating state of at least one of the one or more processing cores of the processor.

17. The apparatus of claim 16, wherein the operating state of the at least one processor core is compliant at least in part with an Advanced Configuration and Power Interface (ACPI).

18. The apparatus of 16, further comprising a module coupled with the processor and the power management logic to simulate a read command and a write command of the processor when the processor is set in an idle mode.

19. The apparatus of 18, further comprising a switch module coupled with the module and one or more interfaces to:
determine that communication traffic from the one or more interfaces does not require processing by the processor; and
route the communication traffic among the one or more interfaces without any processing by the processor.

20. The apparatus of 19, wherein the switch module to determine that the communication traffic from the one or more interfaces does not require processing by the processor is to check that a header of the communication traffic indicates that the communication traffic is not directed to the processor.

21. The apparatus of claim 13, wherein the power management logic is further to control a link state of each of one or more interfaces of the apparatus.

22. The apparatus of claim 21, wherein the one or more interfaces comprise one or more of a Direct Media Interface (DMI), a Peripheral Component Interconnect Express (PCI-E) interface, and a Common System Interface (CSI).

23. The apparatus of claim 21, wherein the one or more interfaces of the SOC are compliant at least in part with an Active State Power Management (ASPM).

24. The apparatus of claim 13, wherein each power gate, in response to an activation of each power gate, is to provide the voltage input to the power domain of the one or more logic blocks.

* * * * *